(12) United States Patent
Lee et al.

(10) Patent No.: US 8,717,636 B2
(45) Date of Patent: May 6, 2014

(54) IMAGE READING DEVICE AND CONTROL METHOD THEREOF

(75) Inventors: Jae Kyu Lee, Seoul (KR); Sung Eun No, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1106 days.

(21) Appl. No.: 12/558,034

(22) Filed: Sep. 11, 2009

(65) Prior Publication Data

US 2010/0103482 A1  Apr. 29, 2010

(30) Foreign Application Priority Data

Oct. 23, 2008 (KR) .................. 10-2008-0104126

(51) Int. Cl.
*H04N 1/04* (2006.01)

(52) U.S. Cl.
USPC ........... 358/461; 358/474; 358/475; 358/484; 358/496; 358/497; 358/406

(58) Field of Classification Search
USPC ......... 358/461, 474, 406, 504, 475, 484, 496, 358/497; 382/274
See application file for complete search history.

(56) References Cited

U.S. PATENT DOCUMENTS

| | | | | |
|---|---|---|---|---|
| 4,907,097 A * | 3/1990 | Sobue | ................. | 358/461 |
| 5,455,690 A * | 10/1995 | Ishikawa | ................. | 358/461 |
| 5,802,217 A * | 9/1998 | Suzuki et al. | ................. | 382/274 |
| 7,136,203 B2 * | 11/2006 | Yokota et al. | ................. | 358/484 |
| 7,316,353 B2 * | 1/2008 | Ikeda et al. | ................. | 235/454 |
| 7,518,760 B2 * | 4/2009 | Matsuda | ................. | 358/474 |
| 7,719,728 B2 * | 5/2010 | Harada | ................. | 358/475 |
| 7,741,608 B2 * | 6/2010 | Takabatake | ................. | 250/370.08 |

FOREIGN PATENT DOCUMENTS

| | | |
|---|---|---|
| JP | 06-284284 | 10/1994 |
| JP | 2003-037717 | 2/2003 |
| JP | 2007150593 A * | 6/2007 |

OTHER PUBLICATIONS

English language abstract of JP 2003-037717, published Feb. 7, 2003.
Machine English language translation of JP 2003-037717, published Feb. 7, 2003.
English language abstract of JP 06-284284, published Oct. 7, 1994.
Machine English language translation of JP 06-284284, published Oct. 7, 1994.

* cited by examiner

*Primary Examiner* — Cheukfan Lee
(74) *Attorney, Agent, or Firm* — Staas & Halsey LLP

(57) ABSTRACT

An image reading device having an improved shading compensation capability and a method thereof are disclosed. The image reading device includes an automatic document feed unit to deliver documents along a document delivery path. A light source unit including a light source to illuminate a first criterion image at a first position within the image reading device, and to illuminate the documents delivered by the automatic document feed unit at a second position. The image reading device further includes a second criterion image arranged to opposingly face the light source unit when the light source unit is located at the second position. The second criterion image extends along a sufficient length to cover the scanning range of the light illumination by the light source unit along a main scanning direction. An image acquisition unit is provided to acquire criterion shading data, auxiliary shading data and image data by receiving light reflected from the first criterion image, the second criterion image and the documents, respectively. A control unit is able to update the criterion shading data using the auxiliary shading data, and to use the updated criterion shading data to compensate the image data.

13 Claims, 7 Drawing Sheets

IMAGE READING DEVICE AND CONTROL METHOD THEREOF

CROSS-REFERENCE TO RELATED APPLICATIONS

This application claims the benefit of Korean Patent Application No. 2008-0104126, filed on Oct. 23, 2008 in the Korean Intellectual Property Office, the disclosure of which is incorporated herein by reference in its entirety.

TECHNICAL FIELD

The present disclosure relates generally to an image reading device, and, more particularly, to an image reading device having an improved shading compensation capability, and to a control method thereof.

BACKGROUND OF RELATED ART

An image reading device is used to read image information recorded in a document. Such an image reading device is provided in a variety of image handling apparatuses, such as, for example, a document scanner, facsimiles, digital copiers, and devices that combining several functions of the foregoing.

An image reading device typically includes a reading unit to optically read image information from a document by irradiating light onto the document, which may be placed on a document table, or may be delivered by an automatic document feeder, for example. To that end, a reading unit generally includes a light source and an image sensor that receives the light reflected from the document. Some image sensors may also convert the received reflected light into an electric signal.

Occasionally, during reading of a document by the reading unit, the image detected by the image sensor may be an inaccurate representation of the original image of the document. For example, the so-called "shading phenomenon" refers to the situation where an original image of a document that otherwise exhibiting uniform density may nevertheless result in non-uniform image sensor output. This phenomenon may be a product of many possible causes, including, for example, the non-uniformity of light emitted from the light source, the tolerance in precision of optical elements or in the assembly thereof, the optical or electrical characteristics of the image sensor, and the like.

Conventional attempts for addressing the above may include the provision of a criterion member, or a calibration image, of known characteristics, e.g., image density, which is located within the movement range of the reading unit, and which is read by the image reading device prior to reading a document in order to obtain criterion or calibration shading data. The criterion shading data is then used to compensate the image data acquired from a document.

SUMMARY OF THE DISCLOSURE

In accordance with one aspect of the present disclosure, there may be provided an image reading device to include a document feed unit, a light source unit, a second criterion member, an image acquisition unit and a control unit. The document feed unit may be configured to cause a document to move along a document delivery path. The light source unit may include a light source configured to generate light, and may be movable between a first position and a second position. The second position may be adjacent to at least a portion of the document delivery path. The light source unit may be further configured to illuminate a first criterion member at the first position, and to illuminate the document received from the document feed unit at the second position. The second criterion member may be arranged to face the light source unit when the light source unit is located at the second position. The second criterion member may have a length that is sufficient to substantially cover a range of a light illumination by the light source unit at the second position. The image acquisition unit may be configured to acquire criterion shading data, auxiliary shading data and image data. The criterion shading data may correspond to a first reflection of the light illumination by the light source unit off the first criterion member. The auxiliary shading data may correspond to a second reflection of the light illumination by the light source unit off the second criterion member. The image data may correspond to a third reflection of the light illumination by the light source off the document. The control unit may be configured to compensate the image data according to the criterion shading data, and to update the criterion shading data with the auxiliary shading data.

The second criterion member may include a white bar disposed along the document delivery path.

The light source may include at least one light emitting diode (LED).

The light source unit may further include a light guide having an incidence face arranged to opposingly face the light emitting diode and an emission face arranged to opposingly face the document delivery path.

The image acquisition unit may include an image sensor having a plurality of pixels. The plurality of pixels may include one or more common pixels that are commonly used for acquisition of both the auxiliary shading data and the image data.

The image reading device may further comprise a shading memory in which the criterion shading data and the auxiliary shading data are stored. Each of the criterion shading data and the auxiliary shading data may include a datum corresponding to each of the one or more common pixels of the image sensor.

The control unit may be further configured to update the criterion shading data on a pixel-by-pixel basis.

The document may comprises a plurality of documents delivered sequentially by the document feed unit. The control unit may be configured to update the criterion shading data between passing of each of the plurality of documents by the second position.

The control unit may be configured to control the light source unit and the image acquisition unit so as to acquire the auxiliary shading data prior to an arrival of any of the plurality of documents at the second position and at a time after a first of two consecutive ones of the plurality of documents has passed by the second position and before a second of two consecutive ones of the plurality of documents arrives at the second position.

The control unit may be configured to update the criterion shading data using the auxiliary shading data that had been previously acquired if the auxiliary shading data most recently acquired does not meet a preset criteria.

The control unit may be configured to update the criterion shading data according to a relationship defined by: $Ru=R(SRn/SR1)$, where $Ru$ is the criterion shading data that has been updated; $R$ is the criterion shading data acquired that correspond to the first reflection of the light illumination by the light source unit off the first criterion member; $SRn$ is the auxiliary shading data acquired between passing of $n-1^{th}$ and $n^{th}$ ones of the plurality of documents by the second position; $SR1$ is the auxiliary shading data acquired prior to the arrival of any of the plurality of documents at the second position, and where n is an integer greater than 1.

According to another aspect, an image reading device may be provided to include a document delivery path along which a document moves, an image reading unit, a calibration structure and a control unit. The document delivery path may include an image reading region. The image reading unit may be arranged adjacent the document delivery path, and may be configured to illuminate, and to receive a light reflected off, the document as the document passes by the image reading region to obtain an image data. The calibration structure may contain a calibration image that provides a calibration data when read by the image reading unit. The calibration structure may be arranged adjacent the image reading region of the document delivery path such that the calibration image becomes obscured from the image reading unit when the document is located at the image reading region of the document delivery path. The control unit may be configured to receive the image data and the calibration data, and to utilize the calibration data to compensate the image data.

The image reading device may further comprise a second calibration structure containing a second calibration image that provides a shading compensation data when read by the image reading unit. The control unit may be configured to update the shading compensation data using the calibration data, and to compensate the image data using the shading compensation data.

According to yet another aspect, a method of compensating an image data read from a document with an image reading unit that illuminates the document as the document passes an image reading region along a document delivery path may be provided to include: acquiring criterion shading data by reading a first criterion image at a location outside the image reading region; acquiring auxiliary shading data by reading a second criterion image at the image reading region, the second criterion image extending substantially an entire range of light illumination of the image reading unit along at least one linear direction; updating the criterion shading data using the auxiliary shading data; and compensating the image data using the updated criterion shading data.

The second criterion image may be a white bar arranged adjacent the document delivery path such that the white bar becomes obscured from the image reading unit when the document is located at the image reading region of the document delivery path.

The document may comprise a plurality of documents sequentially delivered along the document delivery path. The step of acquiring the auxiliary shading data may include: acquiring the first auxiliary shading data by reading the second criterion image prior to an arrival of any documents at the image reading region; and acquiring an $n^{th}$ auxiliary shading data by reading the second criterion image at a time between passing of an $(n-1)^{th}$ one of the plurality of documents by the image reading region and passing of $n^{th}$ one of the plurality of documents by the image reading region, n being an integer greater than 1.

The step of updating the criterion shading data may comprise calculating the updated criterion shading data according to a relationship defined by: Ru=R(SRn/SR1). Ru is the updated criterion shading data. R is the criterion shading data acquired by reading the first criterion image. SRn is the auxiliary shading data acquired by reading the second criterion image at the time between passing of $n-1^{th}$ and $n^{th}$ ones of the plurality of documents by the image reading region. SR1 is the auxiliary shading data acquired prior to the arrival of any document at the image reading region. n is an integer greater than 1.

The image reading unit may comprises an image sensor that includes a plurality of pixels. The method may further comprise storing the criterion shading data and auxiliary shading data. Each of the criterion shading data and the auxiliary shading data may include a datum corresponding to each of the plurality of pixels of the image sensor. The step of updating the criterion shading data may comprise updating the criterion shading data on a pixel-by-pixel basis.

The method may further comprise comparing the $n^{th}$ auxiliary shading data against a preset criteria.

The method may further comprise determining a difference between the first auxiliary shading data and the $n^{th}$ auxiliary shading data; and comparing the difference with a predetermined value.

BRIEF DESCRIPTION OF THE DRAWINGS

Various aspects and advantages of the disclosure will become apparent and more readily appreciated from the following description of the embodiments, taken in conjunction with the accompanying drawings, in which.

DETAILED DESCRIPTION OF SEVERAL EMBODIMENTS

Figure 1:
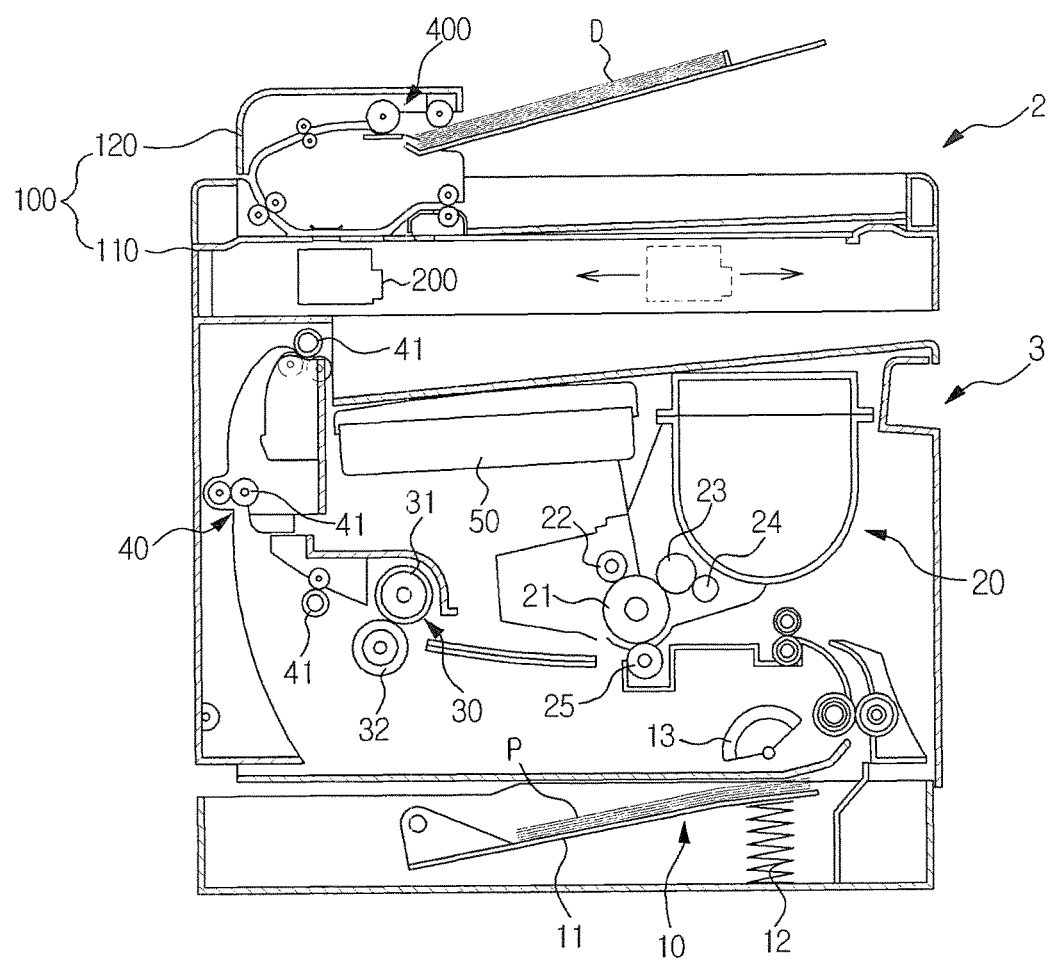
FIG. 1 is a view showing the configuration of a multifunctional apparatus having an image reading device according to an embodiment of the present disclosure.

Reference will now be made in detail to several embodiments of the present invention, examples of which are illustrated in the accompanying drawings, wherein like reference numerals refer to the like elements throughout.

Figure 2:
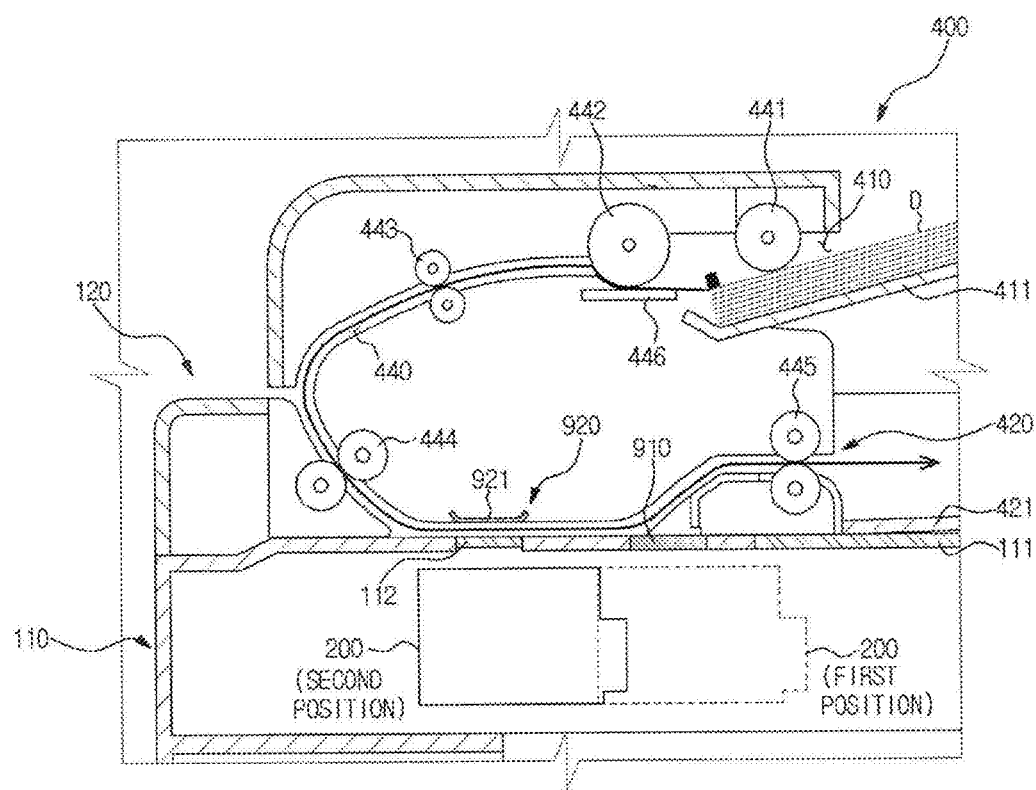
FIG. 2 is an enlarged view showing the relevant portions of the image reading device according to an embodiment of the present disclosure.
Figure 3:
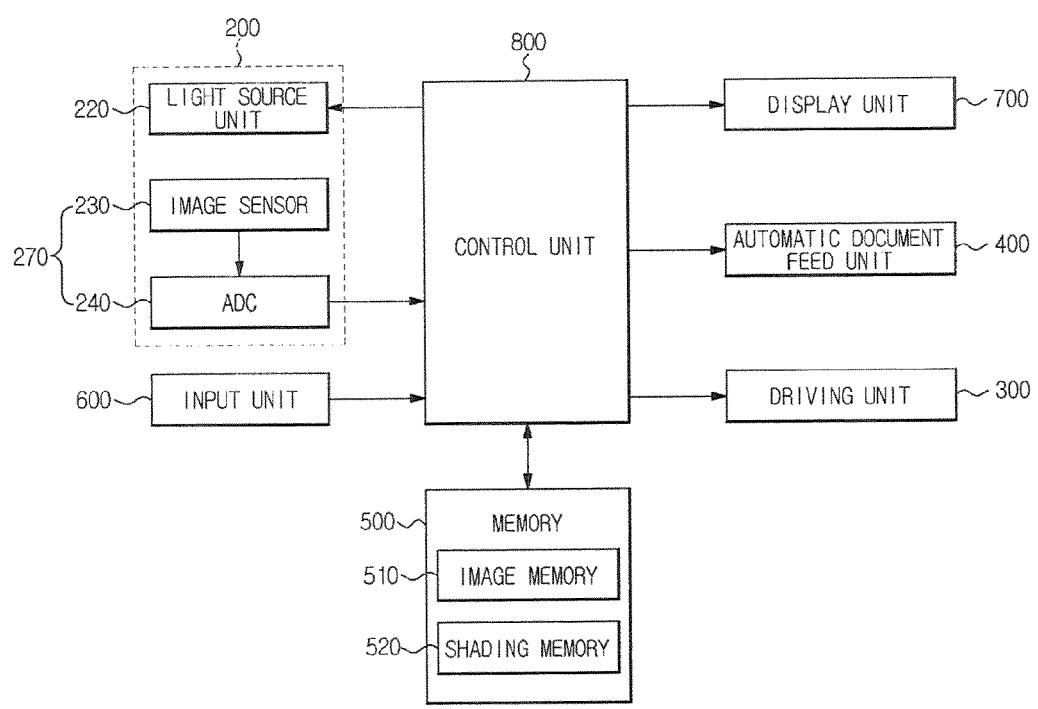
FIG. 3 is a block diagram of the image reading device according to an embodiment of the present disclosure.

FIG. 1 is a view showing the configuration of a multifunctional apparatus 1 having an image reading device according to an embodiment of the present disclosure, FIG. 2 is an enlarged view showing portions of an image reading device according to an embodiment of the present disclosure, and FIG. 3 is a block diagram of the image reading device according to an embodiment of the present disclosure.

As shown in FIG. 1, the multifunctional apparatus 1 may include an image reading device 2 for reading an image from a document and a printing device 3 for printing an image on printing media, e.g., paper.

The printing device 3 serves to print an image on, for example, sheets of paper, according to an image signal received from the image reading device 2, or from an external appliance, such as, for example, a personal computer (PC), or the like. The printing device 3 may include a paper feed unit 10 to feed paper P to a developing unit 20 that forms the image on the paper P, a fixing unit 30 that fixes the image onto the paper P by applying heat and pressure and a paper discharge unit 40 for discharging the paper P bearing the fixed image out of the multifunctional apparatus 1.

The paper feed unit 10 may include a paper tray 11 on which the paper P is loaded and a spring 12 to elastically support the paper tray 11. The paper P loaded in the paper tray 11 is picked up, typically a sheet at a time, by a paper pickup roller 13. The picked up paper P then moves toward the developing unit 20.

The developing unit 20 may include a photoconductor drum 21, on the surface of which is formed an electrostatic latent image by an irradiation of light from an exposure unit 50, a charge roller 22 that electrically charges the photoconductor drum 21, a developing roller 23 that develops the electrostatic latent image on the photoconductor drum 21 with toner, a toner feed roller 24 that supplies the toner to the developing roller 23 and a transfer roller 25 that facilitates the transfer of the toner image to the paper P as the paper P passes between the photoconductor drum 21 and the transfer roller 25.

The fixing unit 30 may include a heating roller 31 containing a heat source and a press roller 32 installed to oppose the heating roller 31 applying a pressure so that the toner image being carried on the paper P becomes fixed to the paper P by the application of the heat and pressure.

The paper discharge unit 40 may include a series of paper discharge rollers 41 arranged to discharge the paper P bearing the fixed toner image to the outside.

According to an embodiment, the image reading device 2 may include a reading device body 100, which may in turn include a scanning frame 110 and a cover 120. The cover 120 may be provided at the scanning frame 110 so as to pivot, rotate or to otherwise be capable of covering and exposing the top portion of the scanning frame 110.

As shown in FIGS. 2 and 3, the image reading device 2 may further include a reading unit 200, a driving unit 300, an automatic document feed unit 400, a memory 500, an input unit 600, a display unit 700 and a control unit 800. The automatic document feed unit 400 may be provided at the cover 120, and allows automatic feeding of documents for continuous document reading operations.

The reading unit 200 may be received in the scanning frame 110. A flat-panel glass 111 and an automatic document feed (ADF) glass 112 may be provided at the top portion of the scanning frame 110.

The reading unit 200 serves to read image information by irradiating light to a document D. For example, the reading unit 200 may be located below the flat-panel glass 111, and may thus be able to read the document D placed on the flat-panel glass 111 while moving across the flat-panel glass 111. The reading unit 200 may in addition or alternatively be stationary below the ADF glass 112, and, in which case, may be able to read image information recorded in the document D as it passes by the ADF glass 112 while being delivered by the automatic document feed unit 400.

Figure 4:
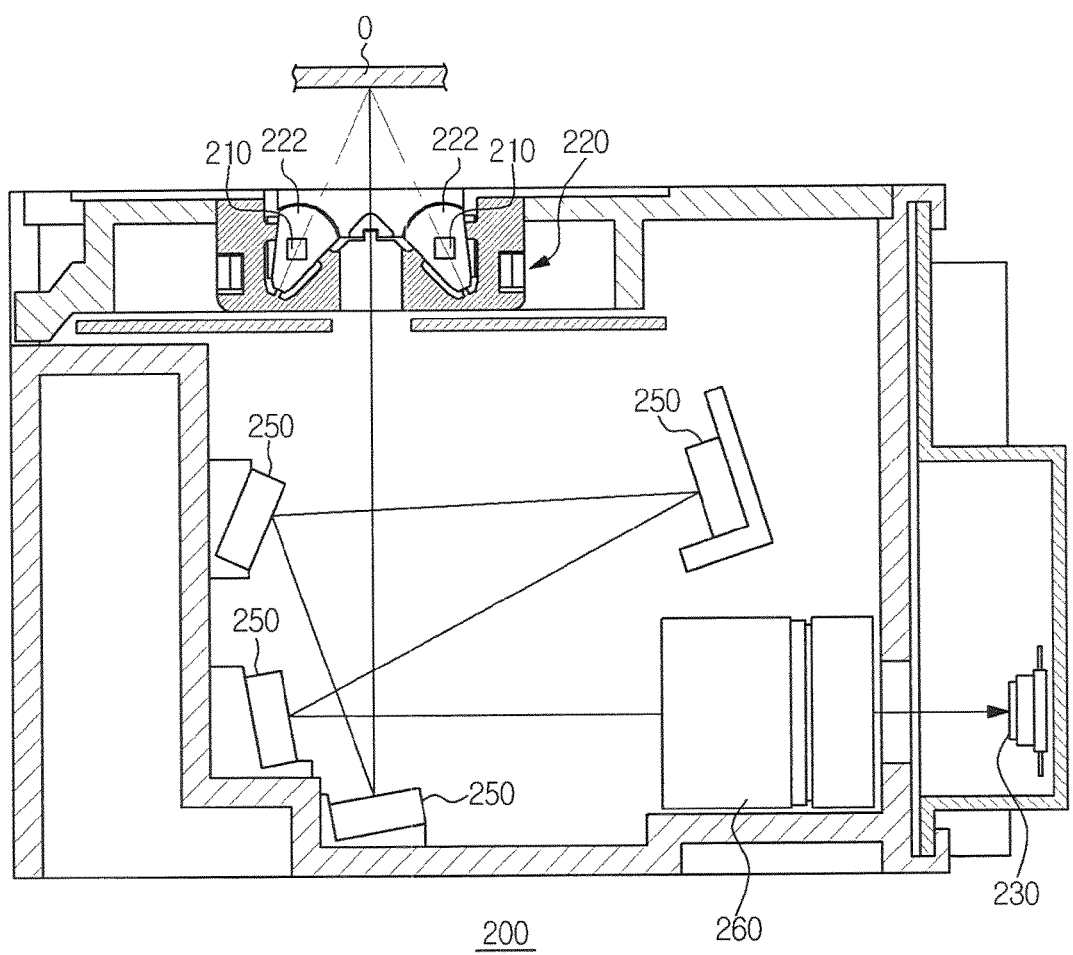
FIG. 4 is a sectional view showing the configuration of a reading unit usable in an image reading device according to an embodiment of the present disclosure.
Figure 5:
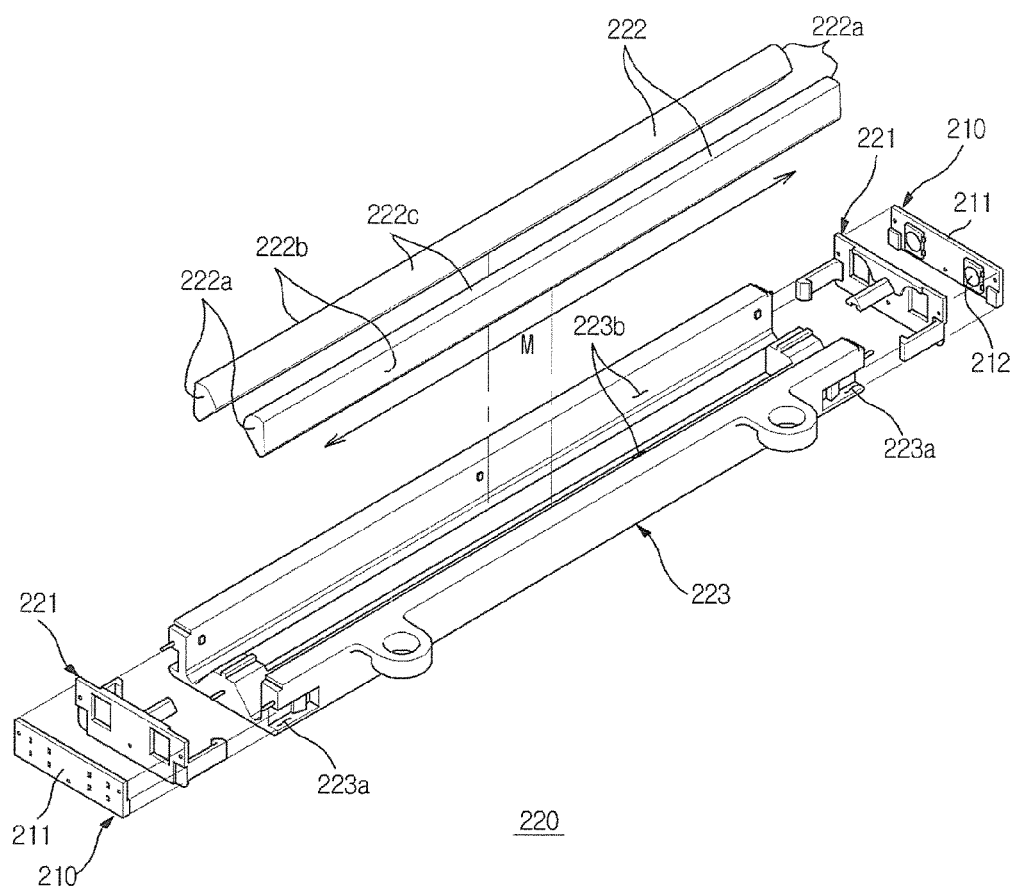
FIG. 5 is a perspective view showing the configuration of a light source unit usable in an image reading device according to an embodiment of the present disclosure.

FIG. 4 is a sectional view showing the configuration of an example of a reading unit according to an embodiment of the present disclosure while FIG. 5 is a perspective view illustrative of the configuration of an example of a light source unit usable an image reading device according to an embodiment.

Referring to FIGS. 3 and 4, the reading unit 200 may include a light source unit 220 containing a light source 210 that emits the light for irradiation of an object O to be read, an image sensor 230 and an analogue/digital converter 240. The reading unit 200 may further include an optical system, which may in turn include one or more reflector members 250 and a condenser lens 260. The optical system may define the optical path of the light from the object O and the image sensor 230. The one or more reflector members 250 serve to direct the light reflected from the object O toward the direction of the image sensor 230. The condenser lens 260 may be disposed in front of the image sensor 230 in the optical path, and may function to focus the light onto the image sensor 230.

The image sensor 230 and analogue/digital converter 240 constitute an image acquisition unit 270 used to acquire the image data. To that end, the image sensor 230 may serve to convert the light reflected from the object O and received by the image sensor 230, into an electric signal. The image sensor 230 may be, for example, a Charge Coupled Device (CCD), Complementary Metal-Oxide-Semiconductor (CMOS), Contact Image Sensor (CIS), or the like known to be capable of photo-electric conversion. The image sensor 230 may output an analogue image signal for a number of detection elements or pixels, which number may depend on the particular desired resolution of the image reading device. The analogue/digital converter 240 serves to represent the analogue image signals in digital form.

As shown in FIG. 5, the light source unit 220 may include a light source 210 that generates the light, a light source holder 221 to that supports light source 210, a light guide 222 extending along the main scanning direction M and a guide holder 223 for supporting the light guide 222.

According to an embodiment, the light source 210 may a semiconductor light source, and may include a substrate 211 and a light emitting diode 212 provided on the substrate 211. The light emitting diode 212 may receive electrical power through the substrate 211 or electrodes provide therein. According to an embodiment, the light emitting diode 212 may be, for example, a white light emitting diode.

The light guide 222 serves to change the path of the light from the light source 210 so as to direct the light to the object O. The light guide 222 may include a plurality of light guides 222, depending on the desired quantity of light to be incident upon the object O, for example.

The light guide 222 may be made of a transparent material, such as glass, plastic, or the like, and may be of a bar shape, the length of which may extend along the main scanning direction M. Each of the light guide 222 may include several faces, which may include, for example, one or more incidence faces 222a, a guide face 222b and an emission face 222c.

According to an embodiment, the incidence faces 222a may be provided at each opposite longitudinal ends of the light guide 222 to receive the light from the light source 210, which may also be provided at both ends of the light guide 222. Each of the light source holders 221 may be disposed to be interposed between the light source 210 and the incidence face 222a. When light is introduced into the light guide 222 through the incidence faces 222a, the guide face 222b serves to guide the light to exit from the emission face 222c. The emission face 222c, through which the light reflected and thus guided by the guide face 222b is emitted, may be arranged to opposingly face the object O.

Shown in FIG. 5 is an embodiment, in which the light source 210 includes a pair of light sources 210 such that the light sources 210 are provided at both ends of the light guide 222. Each of light sources 210 may include a pair of light emitting diodes 212 on the respective substrate 211. In the aforementioned configuration, when a pair of the light guides 222 is provided, the pair of light emitting diodes 212 of a light source 210 each irradiate light to the respective one of the incidence faces 222a the light emitting diode 212 faces.

The guide holder 223 serves to guide installation positions of the light guide(s) 222 and light source(s) 210, and may include the first mounting portion(s) 223*a* for mounting the light source holder(s) 221 and the mounting portion(s) 223*b* for mounting the light guide 222. The guide holder 223, according to an embodiment, allows the light source 210 to be located on at least one end of the light guide 222.

Although in the embodiments thus far described, the reading unit 200 is described as being supported or housed in a single case, it should be readily apparent that various alternative configurations may be possible, including, for example, the provision of the light source and/or the reflector mirror to move in relation to the image sensor during reading of an object image, which is within the contemplation of the present disclosure.

Moreover, while in the afore-described embodiments the light source was described to includes one or more light emitting diodes, it should be readily appreciated and understood by those skilled in the art that other light generating devices, for example, a cold cathode fluorescent lamp, a xenon lamp, or the like, may alternatively be used.

The driving unit 300 (schematically depicted in FIG. 3) may serve to move the reading unit 200 according to a control signal received from the control unit 800. The driving unit 300 may be any device and/or mechanism by which the controlled movement of the reading unit 200 may be achieved, and may include, for example, a belt-pulley mechanism, a rack-and-pinion mechanism, or the like.

As shown in FIG. 2, the automatic document feed unit 400 may include a document inlet 410, through which a document or documents to be read is introduced into the image reading device 2, a document outlet 420 through which a document that has been read is discharged out of the image reading device 2, a document delivery path 440 defined in the interior of the cover 120 for delivery of the document, and one or more document delivery rollers arranged on the document delivery path 440.

According to an embodiment, the document inlet 410 may be provided on one side of the cover 120 while the document outlet 420 may be provided below the document inlet 410. A document loader 411 may be located in vicinity of the document inlet 410, and may hold thereon the document D to be delivered by the automatic document feed unit 400. A document hopper 421 may further be provided in vicinity of the document outlet 420 to hold the already read document as they are discharged from the automatic document feed unit 400.

According to an embodiment, the document delivery path 430 may approximate a C-shaped path. The document delivery path 440 may be thought of as encompassing the entire path of the document(s), starting, on one end, from the document loader 411 through the document inlet 410, and ending, on the other end, at the document hopper 412 through the document outlet 420, or any portion of the aforementioned entire path.

The document delivery rollers may include, for example, a document pickup roller 441 to pick up the document D from the document loader 411, first to third delivery rollers 442, 443 and 444, which deliver the document picked up by the document pickup roller 441 toward the reading unit 200 along the document delivery path 440, and a document discharge roller 445 to discharge the completely read document to the document hopper 412. Of the delivery rollers, the first delivery roller 442 located at the shortest distance from the document pickup roller 441 may additionally perform the function of separating several documents that may have been picked up simultaneously by pickup roller 441 into individual sheets, and delivering further downstream one sheet of the document at a time. To that end, a friction pad 446 may also be installed to oppose the first delivery roller 442 in order to assist in the document separation process.

Figure 6:
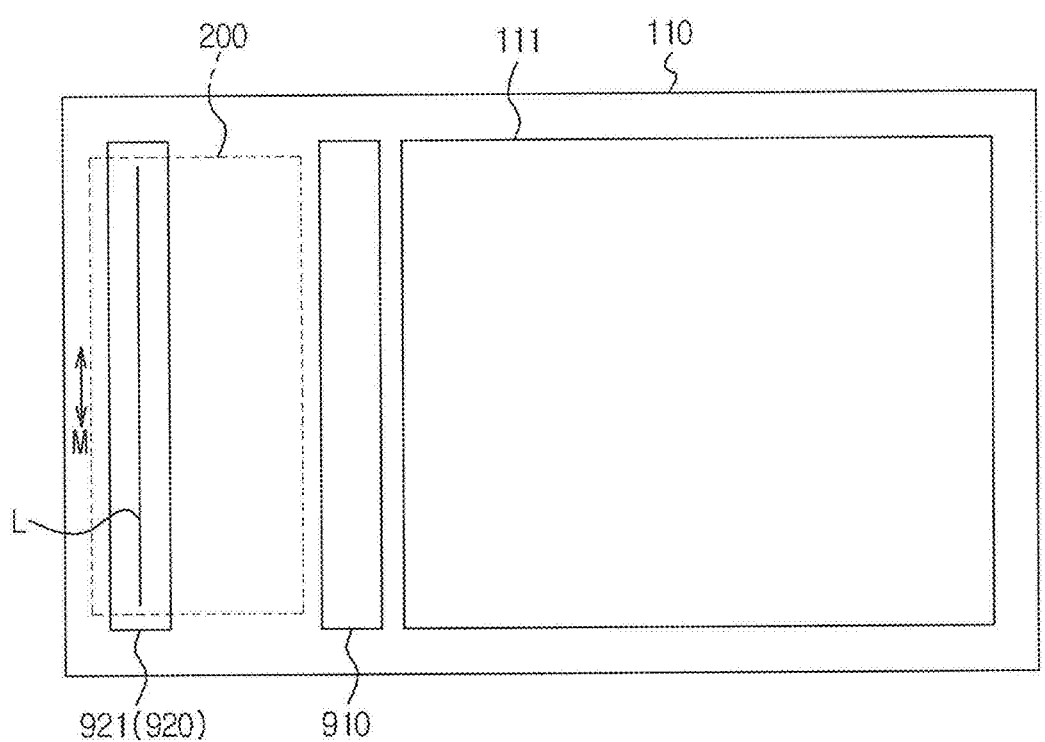
FIG. 6 is a plan view showing a first criterion member, a second criterion member, and a reading of an image reading device according to an embodiment of the present disclosure.

FIG. 6 is a plan view showing a first criterion member, a second criterion member, and the reading unit provided in the image reading device according to an embodiment of the present disclosure.

As shown in FIGS. 2 and 6, the image reading device 2 may include a first criterion member 910 and a second criterion member 920, each of which are arranged within the range of movement of the reading unit 200. The reading unit 200 may acquire criterion shading data by first reading the first criterion member 910, and may acquire auxiliary shading data for updating of the criterion shading data by reading the second criterion member 920.

The first criterion member 910 may be, according to an embodiment, for example, a white sheet member in the main scanning direction M of certain length L. The first criterion member 910 may be located at a side of the flat-panel glass 111 at a position corresponding to a first position of the reading unit 200. The first position may be, for example, the home or initial position of the reading unit 200.

The second criterion member 920 may be disposed in the a scanning frame 110 at a position corresponding to a second position of the reading unit 200. The second position may be, for example, a position at which the reading unit 200 may be able to read an object image from a document delivered via the automatic document feed unit 400, for example, below the ADF glass 112 (shown in FIG. 2). Providing the second criterion member 920 at the second position allows the reading unit 200 to acquire auxiliary shading data for the revision or updating of the criterion shading data in-between documents sequentially delivered by the automatic document feed unit 400. The criterion shading data mat be updated, e.g., between reading of a given number of documents or even after the reading of each individual document. Accordingly, even when the reading unit 200 consecutively reads images recorded in documents, it is possible to prevent deterioration in image quality due to, for example, a variation in the intensity of light from the light source 210. Moreover, the updating of the criterion shading data may be possible without requiring the movement of the reading unit 200, an may allow a reduction in the overall operating time over those known systems that require reacquisition of the shading data by moving the reading unit 200 back to the first position.

According to an aspect of the present disclosure, the second criterion member 920, as shown in FIG. 6, may be positioned to correspond to the document image reading region, and may be configured to cover the entire scanning line L of the light source 210 in the main scanning direction M. This configuration may advantageously enable a more complete and/or accurate update of the criterion shading data throughout the main scanning direction.

In known prior attempts for dealing with the shading phenomenon, a criterion member is provided only for a small peripheral portion of the scanning range along the main scanning direction, i.e., non-image scanning region outside the region occupied by the document being read. Such partial "edge" criterion member is read by a peripheral portion of the image sensor that are not involved in reading the document images, and so acquired auxiliary shading data is used as the predictor for the behavior of the remaining document reading area of the image sensor. The present inventors have found however such partial shading data is not necessarily sufficient for accurate and/or complete update of the criterion shading data that should correspond to substantially the entire scanning or image sensing range. The reason for this may be any one of: 1) the non-uniformity in the intensity of light from the light source along the main scanning direction; 2) the variance in the incident angle of light in the image sensor elements or pixels along the main scanning direction; 3) the non-uniformity of the sensitivity of pixels along the main scanning direction, and/or 4) combined contributions of the aforementioned and from other possible causes. Accordingly, for example, the detection of white image using pixel(s) a peripheral portion of an image sensor may not necessarily provide an accurate prediction for the white detection behavior of the image sensor pixels located at the central portion along the main scanning range. The present inventors have thus found that according to an aspect of the present disclosure acquiring updated criterion shading data substantially throughout the main scanning direction by the use of the second criterion member 920 provided to extend substantially the entire scanning line L of the light source 210 in the main scanning direction M results in a significant improvement in the accuracy of compensation of image data for the shading phenomenon.

In those light source configurations, such as one shown in FIG. 5, that include the light emitting diode 212 as the source of the light and the light guide 222 as the reflective guide to direct the light to the object to be read, it is often difficult to achieve a uniform distribution of light intensity across the main scanning range. Accordingly, the updating the criterion shading data substantially for the entirety of the main scanning direction may have a particularly greater applicability when such light source configuration is employed.

According to an embodiment, the second criterion member 920 may include a white bar 921 disposed on the document delivery path 440 at a position opposite the ADF glass 112. The white bar 921 may also serve the additional purpose of, for example, supporting the backside surface of a document being read, but according to aspects of the present disclosure, it nevertheless is utilized as the criterion member for the acquisition of the auxiliary shading data.

Referring again to FIG. 3, the input unit 600 may have a variety of functional keys (not shown), by the use of which a user may provide user input to set or select the manner in which the multifunctional apparatus 1 operates. The input unit 600 outputs the user input information to the control unit 800. The display unit 700, under the control of the control unit 800, may displays, among other things, the operating condition and/or selected setting of the image reading device 2. The display unit 700 may be, for example, a liquid crystal panel, an LED display, or the like, to display textual and/or graphic messages.

If a reading command is input via the input unit 600, the reading unit 200 reads a document under the control of the control unit 800. For example, if a user places a single document on the flat-panel glass 111, the reading unit 200 reads the image from the document while being driven by the driving unit 300 to move from the first position of FIG. 2 across the flat-panel glass 111 and along the document to be read. On the other hand, if the user selects the reading of one or more documents in the automatic document feed unit 400, the reading unit 200 may sequentially read images of the documents delivered by the automatic document feed unit 400 while remaining stationary at the second position.

For example, when several documents fed from the automatic document feed unit 400 is to be read, prior to the reading of the first one of the documents, the reading unit 200 may first read the first criterion member 910 at the first position to acquire the initial criterion shading data R, and may subsequently read the second criterion member 920 at the second position to acquire the first auxiliary shading data SR1. The reading unit 200 may perform reading of the second criterion member 920 between each of the documents sequentially delivered by the automatic document feed unit 400, resulting in the acquisition of n such auxiliary shading data SR1 through SRn (n≥2). That is, in this example, the reading unit 200 reads the second criterion member 920 between each document so as to acquire auxiliary shading data for each document. That is, the reading unit 200 may be configured to read the second criterion member 920 periodically, the period for which may be based on the timing of the document delivery. In this manner, the period may be selected to acquire the auxiliary shading data for each document or after each reading of any number of documents.

The data acquired by the reading unit 200 may be stored in the memory 500. The memory 500, according to an embodiment, may include an image memory 510 and a shading memory 520. The image data acquired by the reading unit 200 from reading of a document may be stored in the image memory 510. The criterion shading data and the auxiliary shading data, acquired by reading the first criterion member 910 and second criterion member 920, respectively, may be stored in the shading memory 520. According to an embodiment, the shading memory 520 may store the criterion shading data and auxiliary shading data on a per pixel basis of the image sensor 230.

The control unit 800 may control the operations of various components of the image reading device 2 and/or the multifunctional apparatus 1, to implement the various control operations herein described, including, without limitation, the operations to compensate the image data using the criterion shading data and the auxiliary shading data acquired by the reading unit 200. To that end, as would be readily understood by those skilled in the art, the control unit 800 may be, e.g., a microprocessor, a microcontroller or the like, that includes a CPU to execute one or more computer instructions to implement the various control operations herein described, and may further include a memory device, e.g., a Random Access Memory (RAM), Read-Only-Memory (ROM), a flesh memory, or the like, to store the one or more computer instructions. The memory 500, according to an embodiment, may be a part of the memory device included in the control unit 800.

The control unit 800, for example, according to an embodiment, with respect to the image data acquired from the first one of the documents fed by the automatic document feed unit 400, may allow the image data to be compensated using the criterion shading data R acquired upon reading of the first criterion member 910. To account for the possible variation in intensity and/or in the distribution of light from the light source 210 over time, with respect to the remaining documents following the first document, under the control of the control unit 800, the criterion shading data R may be replaced or updated with the auxiliary shading data acquired as the second criterion member 920 is read between the remaining documents, and consequently, image data of the remaining documents can be compensated with the updated criterion shading data.

By way of a more particular example according to an embodiment, the control unit 800 may control the reading unit 200 to read the second criterion member 920 between the reading operations for the first and the second ones of the documents, that is, after the reading of the first document but prior to the reading of the second document, acquiring the second auxiliary shading data SR2. Then, the control unit 800 updates the criterion shading data R using the second auxiliary shading data SR2 and the first auxiliary shading data SR1. According to a more generalized example, the control unit 800 may control the reading unit 200 to read the second criterion member 920 between an n−1$^{th}$ document and an n$^{th}$ document, prior to the reading of the image of the n$^{th}$ document, to acquire the n$^{th}$ auxiliary shading data SRn. The control unit 800 may perform a calculation of the updated criterion shading data Ru using the n$^{th}$ auxiliary shading data SRn and first auxiliary shading data SR1, for example, according to the Equation 1 below:

$$Ru=R(SRn/SR1) \quad \text{(Equation 1)}$$

Having calculated the updated criterion shading data Ru, the control unit 800 may compensate the image data acquired from reading of the n$^{th}$ document based on the updated criterion shading data Ru. Compensating the image data using the dynamically updated criterion shading data between the documents sequentially delivered according to an aspect of the present disclosure may enable a more accurate compensation of the image data even when the light intensity from a light source varies over time.

According to an embodiment, the auxiliary shading data may be stored on a per pixel basis of the image sensor 230, allowing the updating of the criterion shading data and/or the compensation of the image data also on a per pixel basis. In this case, even if the intensity of the light from the light source 210 is not uniform across the main scanning direction, it may be possible to accurately compensate the image data for each pixel, which may result in an improvement in the image quality.

However, it should be noted that it is also within the contemplation of the present disclosure that in some embodiments a determination may be made as to the degree or the extent of the variation of the intensity and/or the distribution of the light across the main scanning direction, and that if the variation is less than a threshold value, then according to such embodiment, only a certain number of specific pixels of the image sensor may be selected for the update of the criterion shading data and/or the compensation of the image data for the specific select pixels.

According to an aspect of the present disclosure, in order to address those situations that may make the acquisition of the auxiliary shading data becomes difficult or no longer desirable, for example, when the second criterion member 920 is contaminated, or when insufficient time is allowable for the reading of the second criterion member 920, the control unit 800 may, based on a determination that the value of the acquired auxiliary shading data may be erroneous, for example, when the newly acquired value is less or more than a preset value as a result of a comparison with the previously acquired value, the control unit 800 may update the criterion shading data R using previously acquired auxiliary shading data instead of the most recent erroneous auxiliary shading data.

According to an embodiment, the control unit 800, in lieu of updating the criterion shading data for each document, may update the criterion shading data R for the n$^{th}$ document only upon the determination that the difference value between the first auxiliary shading data SR1 and the n$^{th}$ auxiliary shading data SRn is greater than a preset threshold value.

Figure 7:
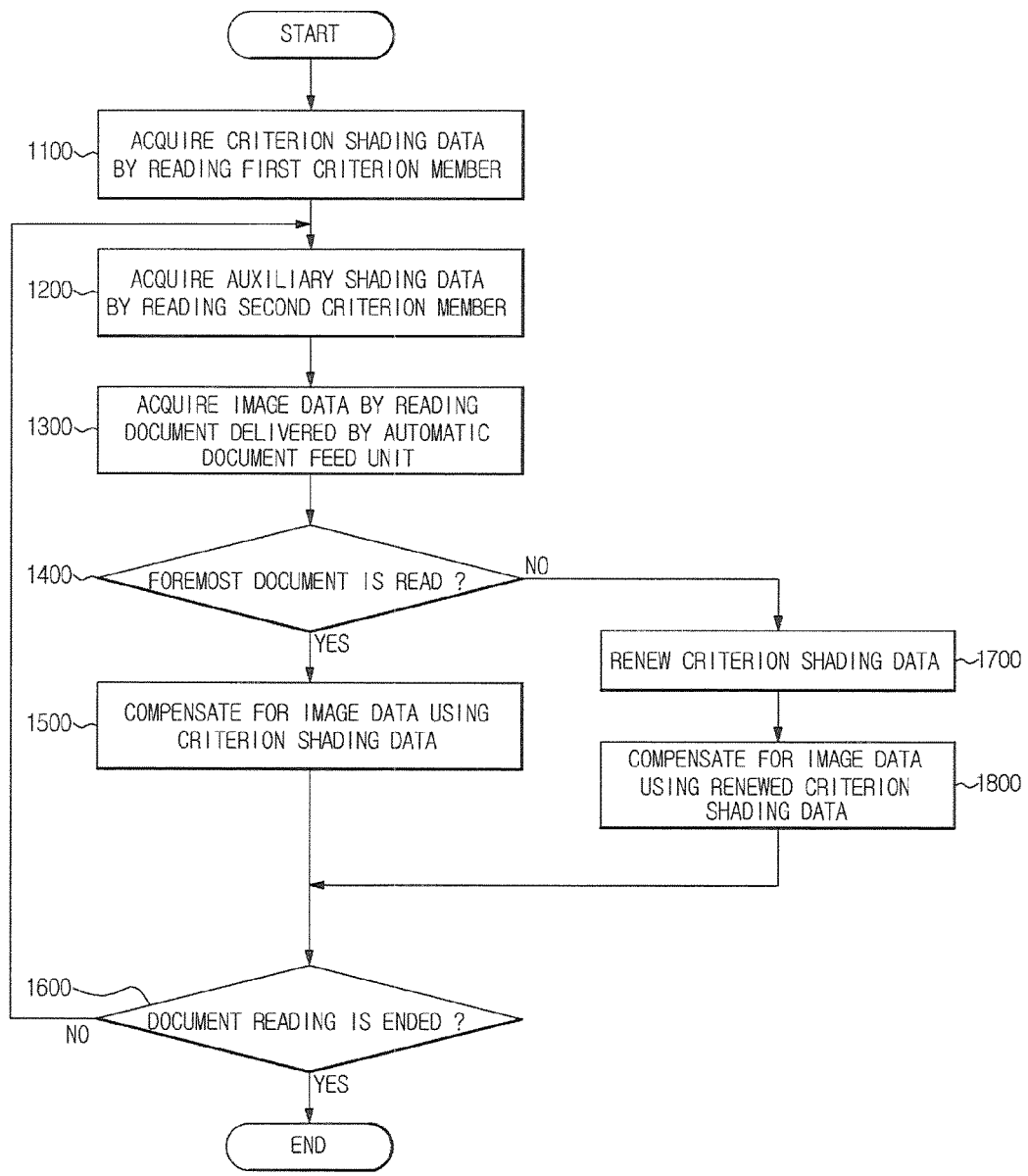
FIG. 7 is a flowchart illustrating a method of controlling an image reading device according to an embodiment of the present disclosure.

FIG. 7 is a flowchart illustrating a control method of the image reading device according to an embodiment of the present disclosure.

According to an embodiment, for an ADF mode document scanning, e.g., when the user loads documents on the automatic document feed unit 400 and inputs a reading command, the control unit 800 controls the driving unit 300 so as to move the reading unit 200 to the first position prior to reading the foremost one of the documents. The control unit 800 also controls the light source unit 220 to irradiate light to the first criterion member 910, and stores the criterion shading data, acquired via the image acquisition unit 270, in the shading memory 520 (at 1100).

After storing the criterion shading data, the control unit 800 controls the driving unit 300 so as to move the reading unit 200 to the second position. The control unit 800 also controls the light source unit 220 to irradiate light to the second criterion member 920, and stores the first auxiliary shading data, acquired via the image acquisition unit 270, in the shading memory 520 (at 1200).

The control unit 800 at an appropriate timing controls the automatic document feed unit 400 to deliver the documents toward the ADF glass 112 a sheet at a time. The reading unit 200 reads the documents, delivered by the automatic document feed unit 400, at the second position, to acquire image data recorded in the documents, and stores the image data in the image memory 510 (at 1300).

The control unit 800 determines whether or not the document read by the reading unit 200 is a foremost one of the documents (at 1400). If the determined result is affirmative, the control unit 800 compensates for image data using the criterion shading data acquired at 1100 without an update of the criterion shading data (at 1500).

Thereafter, the control unit 800 determines whether or not the document reading operation has ended (at 1600). If the document reading operation has not ended, the reading unit 200 acquires the n$^{th}$ auxiliary shading data by reading the second criterion member 920 between the documents delivered by the automatic document feed unit 400, more particularly, between an n−1$^{th}$ document and an n$^{th}$ document (at 1200).

The control unit 800 allows image data, acquired by reading the document following the foremost document, i.e. the n$^{th}$ document, to be stored in the image memory 510 (at 1300).

The control unit 800 determines that the current document is not the foremost one of the documents (at 1400), and updates the criterion shading data for the n$^{th}$ document based on the above Equation 1 (at 1700). According to an embodiment, the criterion shading data can be renewed or updated on a per pixel basis of the image sensor 230. As previously described, according to an embodiment, if the control unit 800 determines the value of the n$^{th}$ auxiliary shading data may be erroneous, the criterion shading data may be updated using the previously acquired auxiliary shading data instead of the most recent erroneous auxiliary shading data. According to an embodiment, the control unit 800 may update the criterion shading data only when the difference value between the first auxiliary shading data and the n$^{th}$ auxiliary shading data is greater than a preset value.

The control unit 800 compensates for image data of the n$^{th}$ document using the renewed criterion shading data (at 1800), and repeat the processes 1200 through 1800 until the determination that all of the documents have been read (at 1600), at which point, the document scanning operation may end.

Although several embodiments of the present disclosure have been shown and described, it would be appreciated by those skilled in the art that changes may be made in these embodiments without departing from the principles and spirit of the inventive aspects of the present disclosure, the scope of which is defined in the claims and their equivalents.

What is claimed is:

1. An image reading device, comprising:
   a document feed unit configured to cause a document to move along a document delivery path;
   a light source unit including a plurality of light sources configured to generate light and a separate light guide associated with each light source, the light source unit being movable between a first position and a second position, the second position being adjacent to at least a portion of the document delivery path, the light source unit being further configured to illuminate a first criterion member at the first position, and to illuminate the document received from the document feed unit at the second position;

a second criterion member arranged to face the light source unit when the light source unit is located at the second position, the second criterion member having a length that is sufficient to substantially cover a range of a light illumination by the light source unit at the second position;

an image acquisition unit configured to acquire criterion shading data, auxiliary shading data and image data, the criterion shading data corresponding to a first reflection of the light illumination by the light source unit off the first criterion member, the auxiliary shading data corresponding to a second reflection of the light illumination by the light source unit off the second criterion member, the image data corresponding to a third reflection of the light illumination by the light source off the document; and a control unit configured to compensate the image data according to the criterion shading data, and to update the criterion shading data with the auxiliary shading data;

wherein the light source unit comprises a light guide holder that comprises a separate recess to receive the light guides, such that each recess receives one of the light guides;

wherein the document comprises a plurality of documents delivered sequentially by the document feed unit, the control unit being configured to update the criterion shading data between passing of each of the plurality of documents by the second position;

wherein the control unit is configured to control the light source unit and the image acquisition unit so as to acquire the auxiliary shading data prior to an arrival of any of the plurality of documents at the second position and at a time after a first of two consecutive ones of the plurality of documents has passed by the second position and before a second of the two consecutive ones of the plurality of documents arrives at the second position;

wherein the control unit is configured to update the criterion shading data according to a relationship defined by:

$Ru = R(SRn/SR1)$, wherein Ru is the criterion shading data that has been updated, R being the criterion shading data acquired that correspond to the first reflection of the light illumination by the light source unit off the first criterion member, SRn being the auxiliary shading data acquired between passing of $n-1^{th}$ and $n^{th}$ ones of the plurality of documents by the second position, SR1 being the auxiliary shading data acquired prior to the arrival of any of the plurality of documents at the second position, n being an integer greater than 1.

2. The image reading device according to claim 1, wherein the second criterion member includes a white bar disposed along the document delivery path.

3. The image reading device according to claim 1, wherein each light source includes at least one light emitting diode (LED).

4. The image reading device according to claim 3, wherein each light guide has an incidence face arranged to opposingly face the light emitting diode and an emission face arranged to opposingly face the document delivery path.

5. The image reading device according to claim 1, wherein the image acquisition unit includes an image sensor having a plurality of pixels, and
wherein the plurality of pixels includes one or more common pixels that are commonly used for acquisition of both the auxiliary shading data and the image data.

6. The image reading device according to claim 5, further comprising: a shading memory in which the criterion shading data and the auxiliary shading data are stored, each of the criterion shading data and the auxiliary shading data including a datum corresponding to each of the one or more common pixels of the image sensor.

7. The image reading device according to claim 6, wherein the control unit is further configured to update the criterion shading data on a pixel-by-pixel basis.

8. The image reading device according to claim 1, wherein the control unit is configured to update the criterion shading data using the auxiliary shading data that had been previously acquired if the auxiliary shading data most recently acquired does not meet a preset criteria.

9. A method of compensating an image data read from a plurality of documents sequentially delivered along a document delivery path with an image reading unit that illuminates the documents as the documents pass an image reading region along the document delivery path, comprising:
acquiring criterion shading data by reading a first criterion image at a location outside the image reading region;
acquiring first auxiliary shading data by reading a second criterion image prior to an arrival of any documents at the image reading region, the second criterion image extending substantially an entire range of light illumination of the image reading unit along at least one linear direction;
acquiring an nth auxiliary shading data by reading the second criterion image at a time between passing of an (n-1) th one of the plurality of documents by the image reading region and passing of nth one of the plurality of documents by the image reading region, n being an integer greater than 1;
updating the criterion shading data using the relation of the first auxiliary shading data and the nth auxiliary shading data; and
compensating the image data using the updated criterion shading data;
wherein the document comprises a plurality of documents sequentially delivered along the document delivery path, the step of acquiring the auxiliary shading data includes:
acquiring the first auxiliary shading data by reading the second criterion image prior to an arrival of any documents at the image reading region; and
acquiring an $n^{th}$ auxiliary shading data by reading the second criterion image at a time between passing of an (n-1)$^{th}$ one of the plurality of documents by the image reading region and passing of $n^{th}$ one of the plurality of documents by the image reading region, n being an integer greater than 1;
wherein the step of updating the criterion shading data comprises:
calculating the updated criterion shading data according to a relationship defined by:

$Ru = R(SRn/SR1)$, wherein Ru is the updated criterion shading data, R being the criterion shading data acquired by reading the first criterion image, SRn being the auxiliary shading data acquired by reading the second criterion image at the time between passing of n-1$^{th}$ and n$^{th}$ ones of the plurality of documents by the image reading region, SR1 being the auxiliary shading data acquired prior to the arrival of any document at the image reading region, n being an integer greater than 1.

10. The method according to claim 9, wherein the second criterion image being a white bar arranged adjacent to the document delivery path such that the white bar becomes obscured from the image reading unit when the document is located at the image reading region of the document delivery path.

11. The method according to claim 9, wherein the image reading unit comprises an image sensor that includes a plurality of pixels, the method further comprising:
   storing the criterion shading data and auxiliary shading data, each of the criterion shading data and the auxiliary shading data including a datum corresponding to each of the plurality of pixels of the image sensor, and wherein the step of updating the criterion shading data comprises updating the criterion shading data on a pixel-by-pixel basis.

12. The method according to claim 9, further comprising:
   comparing the n$^{th}$ auxiliary shading data against a preset criteria.

13. The method according to claim 9, further comprising:
   determining a difference between the first auxiliary shading data and the n$^{th}$ auxiliary shading data; and
   comparing the difference with a predetermined value.

* * * * *